April 6, 1926.
G. H. SAUTON
1,579,954
GAS METER PROTECTING MEANS
Filed June 26, 1924     4 Sheets-Sheet 1
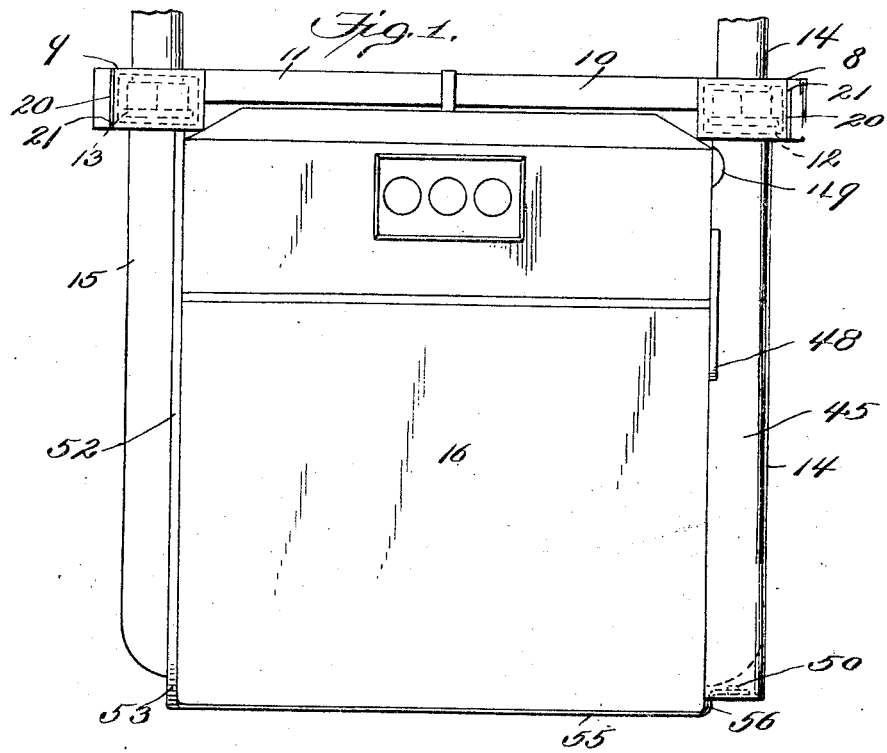
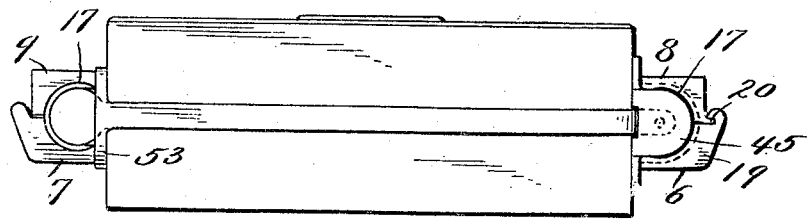
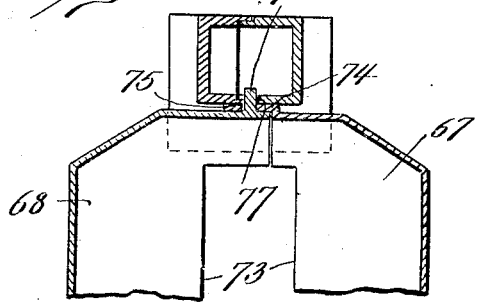
Inventor
George H. Sauton
By James L. Norris
Attorney April 6, 1926.
G. H. SAUTON
1,579,954
GAS METER PROTECTING MEANS
Filed June 26, 1924 4 Sheets-Sheet 2
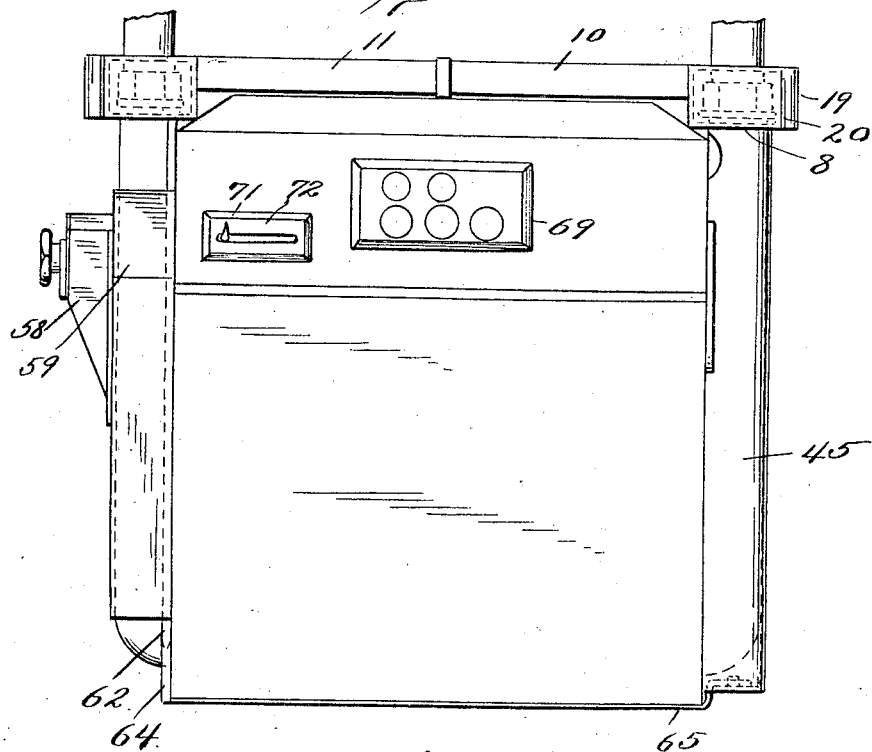
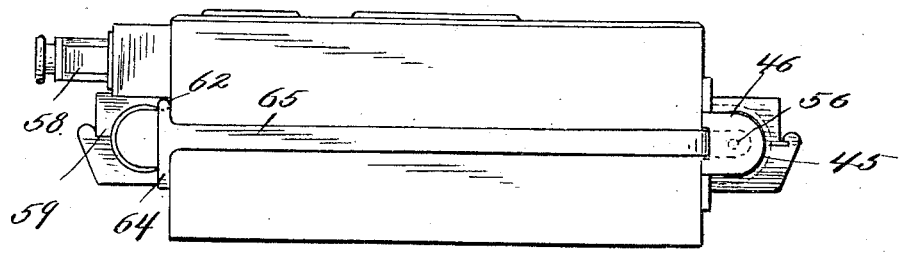

April 6, 1926.
G. H. SAUTON
GAS METER PROTECTING MEANS
Filed June 26, 1924   4 Sheets-Sheet 3
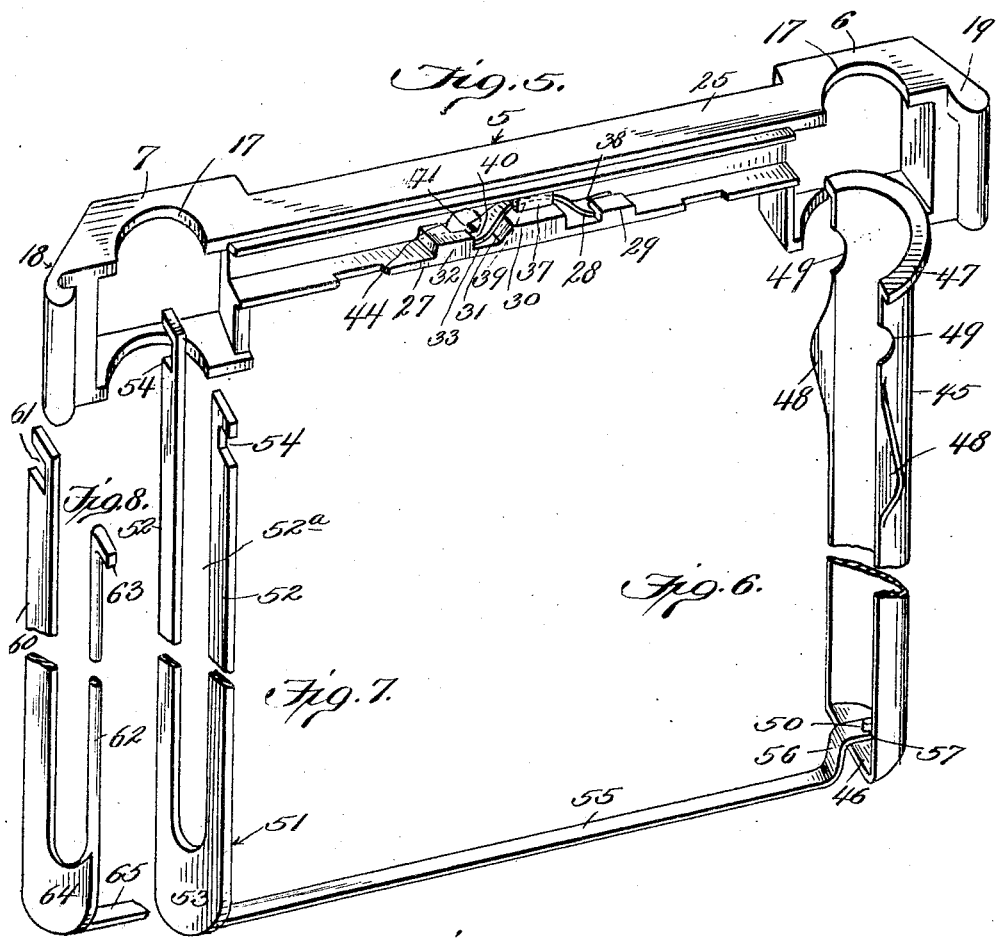
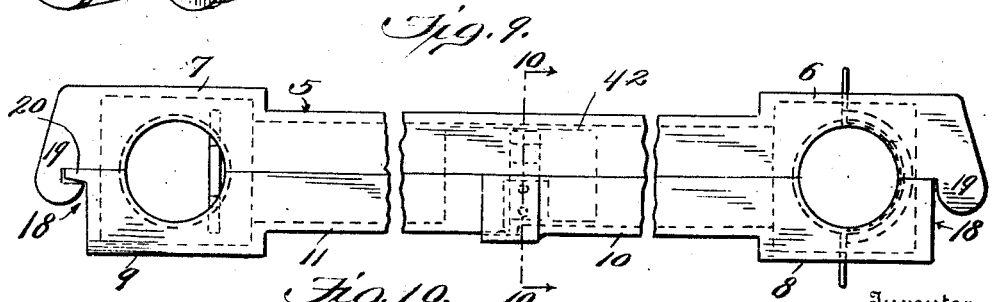
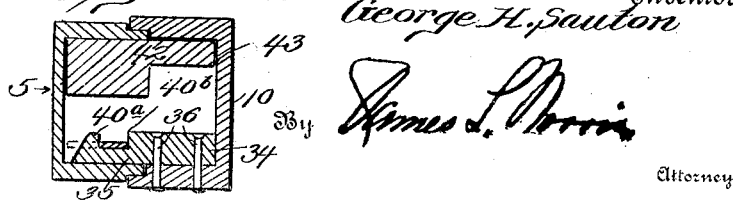

April 6, 1926.
G. H. SAUTON
GAS METER PROTECTING MEANS
Filed June 26, 1924 4 Sheets-Sheet 4
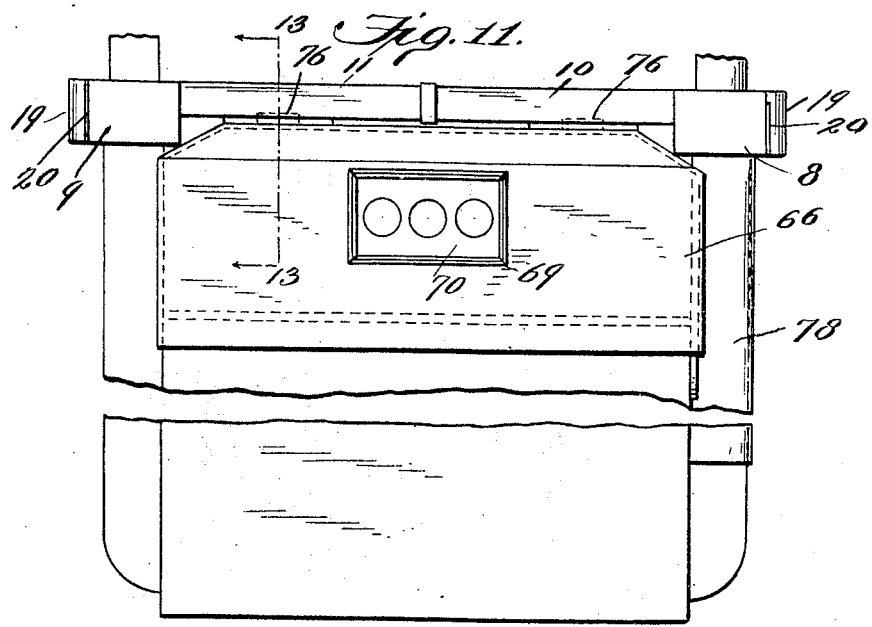
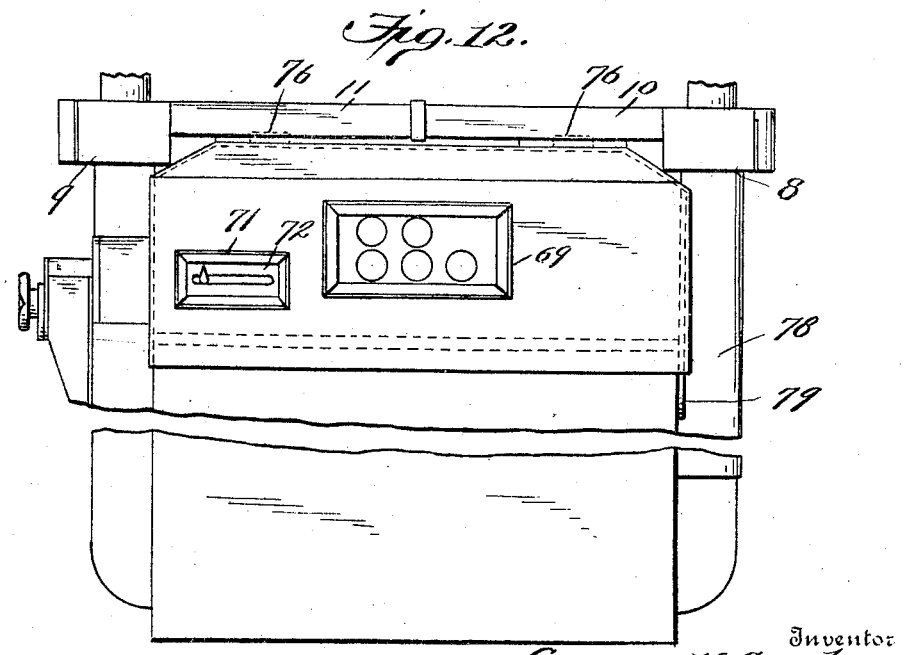
Inventor
George H. Sauton
By James L. Norris
Attorney Patented Apr. 6, 1926.

1,579,954

UNITED STATES PATENT OFFICE.

GEORGE H. SAUTON, OF NEW ORLEANS, LOUISIANA, ASSIGNOR OF ONE TWENTY-FOURTH TO CHARLES F. A. HEITKAMP, ONE TWENTY-FOURTH TO SIMON A. G. HEITKAMP, AND ONE TWENTY-FOURTH TO OSCAR R. L. HEITKAMP, ALL OF NEW ORLEANS, LOUISIANA.

GAS-METER-PROTECTING MEANS.

Application filed June 26, 1924. Serial No. 722,561.

*To all whom it may concern:*

Be it known that I, GEORGE H. SAUTON, a citizen of the United States, residing at New Orleans, parish of Orleans, and State of Louisiana, have invented certain new and useful Improvements in Gas-Meter-Protecting Means, of which the following is a specification.

This invention relates to gas meter protecting means, and the primary object of the invention is to provide improved devices for completely enclosing and locking the coupling unions or nuts of the communicating pipes of a gas meter or similar registering device, and also to protect portions of the opposite sides and in some instances to partially cover the top of the gas meter, to prevent any possibility of tampering with the coupling unions or nuts or vulnerable parts of the gas meter by unauthorized persons, and thereby obstruct nefarious interference with the regular flow of gas through the meter and false registration of the amount of gas used by the consumer. A further object of the invention is to apply the several features of the protecting means to different parts of a gas meter and fix the improved features in positively applied positions by a locking organization embodying concealed locking means which will resist all tampering efforts to release the same by preventing the introduction of wires or implements of any sort from the exterior of the locking organization for the purpose of reaching and releasing the locking components. A still further object of the invention is to apply improved protective features to different parts of a gas meter that are normally penetrable from the exterior, or separable, and therefore offer little or no resistance to irregular methods commonly used to defeat the proper flow of gas to and through the meter and registration of the amount of gas used by employing a locking organization that requires breakage to open the same and obstructs resetting or reapplying the parts thereof to normal positions relatively to the parts of the meter, and whereby any irregular attempts to tamper with the meter and particularly breakage of the locking means will be readily detectable or discernible to authorized persons subsequently examining the meter.

With these and other objects and advantages in view, the invention consists in the construction and arrangement of the several parts which will be more fully hereinafter described and claimed.

In the drawings:

Fig. 1 is a front elevation of a gas meter of ordinary form and portions of the communicating pipes therefor, showing one form of the improved protecting means applied thereto and illustrated as being locked;

Fig. 2 is a bottom plan view of the meter as shown by Fig. 1 with one form of the improved locking means applied thereto;

Fig. 3 is a view similar to Fig. 1, showing a prepaid form of meter having the improved features applied thereto and modified in accordance with the difference of construction relatively to those applied to a monthly meter;

Fig. 4 is a bottom plan view of the meter and improvements as shown by Fig. 3;

Fig. 5 is a detail perspective view of a part of the locking means which extends across the top of the various forms of the meter and engages the pipe unions or nuts;

Fig. 6 is a detail perspective view of a side protecting device, showing the manner of assembling the same with the locking means;

Fig. 7 is a detail perspective view of the opposite side protecting means, illustrating an integral connecting device shown assembled with the bottom of the device illustrated by Fig. 6;

Fig. 8 is a detail perspective view of a modification of the side protecting means shown by Fig. 7 and adapted for application to a prepaid meter;

Fig. 9 is a top plan view of the locking means complete, showing parts of the structure therein in dotted lines;

Fig. 10 is a transverse vertical section on the line 10—10, Fig. 9;

Fig. 11 is a front elevation of a monthly type of meter showing the improved protecting and locking means applied thereto and including a casing or sheathing for the top portion of the meter, the latter being shown broken through;

Fig. 12 is a view similar to Fig. 11, showing the same structure applicable to a prepaid meter; and Fig. 13 is a transverse vertical section through a portion of the casing or cover for the top of the meter and the locking means.

The present gas meter protecting means embodies features of improvement relatively to the structure disclosed by my pending application filed August 18, 1922, Serial No. 582,669, and corresponding parts shown and described by the said application will be hereinafter referred to with sufficient clearness to illustrate the features of the present improvement.

The improved protecting means comprising the present features of the invention include a continuous shell or tubular member 5 fixed at its opposite ends to enclosures or box-like members 6 and 7 of similar construction and to which are respectively hinged like enclosures or box members 8 and 9 having tubular connecting arms 10 and 11 projecting inwardly therefrom and adapted to overlap when closed against the shell or tubular member 5, and form with the latter a complete tubular housing and connecting or bridging means between the end closures or box members, and applicable over the coupling unions or joint nuts 12 and 13 of the pipes 14 and 15 having communication with the meter 16 in the usual manner. The construction thus far explained is essentially similar to the construction disclosed by my pending application hereinbefore noted and is shown applied in Figs. 1 and 2 to a monthly type of meter and is also illustrated by Figs. 5, 6, 7, 8, 9 and 10 in conjunction with additional features which also constitute parts of the present improvement. To adapt the application of the closures or box sections 6 and 8 and 7 and 9 over the couplings or joint nuts 12 and 13 of the pipes 14 and 15 as shown by Figs. 1 and 2, the said closures or box sections are formed with semicircular openings 17 in the upper and lower sides thereof, which conjointly produce circular openings when the said sections are closed. It is preferred that the continuous shell or tubular member 5 with its end closures or box members 6 and 7 and the tubular connecting arms 10 and 11 with their enclosures or box members 8 and 9 be constructed from suitable metal by casting in accordance with the features of improvement, and adjacent to the outer ends 18 of the respective enclosures or box-like sections 6 and 7 and 8 and 9 are reversely arranged hinge structures, each consisting of outwardly projecting diagonally disposed slotted knuckle members 19 forming portions of the box-like members 6 and 7 and outwardly projecting right-angular flanges 20 to fit in the slotted knuckles 19 and form as parts of or secured to the enclosures or box members 8 and 9, the flanges 20 being shouldered, as at 21, to abut against the upper and lower terminals of the slots of the knuckles as a stop means and to produce a correct assemblage of the several box members 6 and 7 and 8 and 9 in accordance with a predetermined desired arrangement of the parts. The flanges 20 are reversely associated with the knuckles 19, to provide for convenience in assemblage of the several connected parts and to accurately retain the several parts in their proper positions when being applied. The reverse positions of the slotted knuckles 19 and flanges 20 of the box-like members 6 and 7 and 8 and 9 also provide hinged joint connections which will permit the free opening and closing movement of the sections 8 and 9 and their tubular arms 10 and 11 relatively to the shell or tubular member 5 and the sections 6 and 7, and also to so position the said enclosures or box-like sections that they may partially overlap and the top and bottom portions thereof to effectively seal the joints between the sections when the parts are closed and locked. This same joint sealing provision is clearly illustrated and described in my aforesaid pending application. The opposing sections 7 and 8 will be constructed with overlapping flanges similar to the construction shown in my pending application, said flanges continuing from the bottom portions of the sections and closely fitting to seal the lower joints as just explained.

As shown by Figs. 5, 9 and 10, the locking mechanism, which is mainly held within the shell or tubular member 5, is essentially of the same construction as in my pending application above noted and as previously stated, and comprises a flat metal spring 28 held in the member 5 at the center of the latter by a retention lug 37 depending from the top plate 25 of the said member, the spring 28 having a bowed portion 39 engaging the said lug, as shown by dotted line in Fig. 5. On one side of the center of the bottom plate 27 of the shell or tubular member 5 is an angular keeper 29 which projects over the inner side of the said latter plate at a suitable distance from a combined space and guard block 30 of considerable thickness and of a width to extend fully over the inner side of said bottom plate 27. The one end 31 of the guard and space block 30 is beveled, to form a clearance for the action of the spring 28 and facilitate the insertion of a catch device, which will be hereinafter explained. Adjacent to the beveled end 31 of the block 30 is an angular or L-shaped combined guard and space block 32, which is of less thickness than the block 30 but forms with the beveled end 31 of the latter a pocket or locking space 33. The opposite ends of the spring 28 respectively engage the angular keeper 29 and terminate adjacent to the inner edge of the block 32. The pocket or locking space 33 is provided for the reception and movement of a projecting catch 35 carried by the inner end of the member 10, so that the said catch will be located between the beveled end 31 of the block 30 and the adjacent end of the block 32. In the present construction this catch differs from that shown in my pending application and consists of a transverse bar of suitable thickness and length having a shank 34 secured against the upper side of the bottom of the member 10 by rivets 36 extending through said bottom and the shank, as shown by Fig. 10. The catch 35 projects inwardly far enough beyond the terminal edge of the bottom of the member 10 to enter the pocket or locking space 33 to perform its locking function with respect to the extremity of the spring 28 between the beveled end 31 of the block 30 and the inner edge of the block 32 and bears upon the upper side of the bottom of the continuous shell or tubular member 5. The free end 38 of the spring is flattened and pushed under the keeper 29, as shown by Fig. 5, and the opposite free end 40 of the spring is also straightened and normally stands at a slight incline to the intermediate bowed portion of the spring and has a slot 41 at the inner edge, which is engaged by a shouldered nose or terminal 40ª of the catch 35, the latter being transversely slotted, as at 40ᵇ, to provide said shouldered nose, as clearly shown by Fig. 10. At the inner free end of the member 11 is a wedge block or tongue 42 similar to the block or tongue shown and described in my pending application above noted and as illustrated in dotted lines in plan view in Fig. 9. This wedge block or tongue 42 extends beyond the inner end of the member 11 a sufficient distance to project over the catch 35 carried by the member 10 when the latter member is closed, and in the present instance the outer portion of the said block or tongue 42 is formed with a recess 43 which is located over the upper ends of the rivets 36 when the members 10 and 11 are closed and locked to the shell or tubular member 5. The catch 35 is made separate from the member 10 and secured by the rivets 36 in the present improvement, to economize in the construction of the several parts and particularly the member 10. It is obvious that the formation by casting of the member 10 with the catch 35 may be more readily accomplished by separately constructing the said catch and securing the same to the bottom of the member 10 by the rivets 36 than to integrally form the catch with the member 10 as shown and described in my pending application above noted. To separate or release the member 10 from the member 11, or open the said members by authorized persons having knowledge of the structure of the locking means explained, it will be necessary to cut off the heads of the rivets 36 and drive the latter into the enclosing members far enough to disengage the said rivets from the member 10, the recess 43 in the block or tongue 42 being provided to give ample clearance or inward projection of the rivets 36 when driven inwardly to become disengaged from the member 10. By driving the rivets 36 inwardly as just stated, the section 10 will be free for opening movement far enough to release the remaining locking features and including a ball 44, which is introduced between the inner angular edge of the block 32 and the block or tongue 42 on top of the end 40 of the spring 28, the said ball when thus applied being retained in locking position and obstructing release of the locking organization by ordinary means or through the medium of the introduction of implements into the interior of the enclosing members for the purpose of displacing the ball 44. All of the joints of the parts or members 5, 10 and 11 are covered or have a close fitting association, so as to resist introduction therethrough or between the edges of the said members of any sort of device in an attempt to irregularly tamper with the locking mechanism.

In the first form of the protective means for the opposite sides of the monthly meter as particularly shown by Figs. 1 and 2 and illustrated in detail by Figs. 6 and 7, an approximately semicircular shield or enclosure 45 of suitable metal is provided and formed with a lower closed bottom 46 and an upper flange 47. At a suitable distance below the upper flange 47 and adjacent to the inner edges of the semicircular shield or enclosure 45 are laterally projecting flat guard flanges 48, and at a short distance above the upper termination of these flanges the said inner edges of the shield are formed with semicircular recesses 49. Extending upwardly from the center of the closed bottom 46 of the shield 45 is a stud 50 which serves as a securing device for the remaining portion of the protecting means, which will now be described. The side of the meter opposite that to which the shield or enclosure 45 is applied is also engaged by a flat protector or guard 51 in the form of a bifurcated plate or fork having opposite parallel arms 52 of similar dimensions and integrally formed with a lower web or connecting member 53. The outer edges of the upper ends of the arms 52 are formed with transverse slots 54, to engage the closures or box-like sections 7 and 9. Extending horizontally from the lower end of the protector or guard 51 and also integrally formed with the web or connecting member 53 is a coupling bar 55 having its free end angularly bent or stepped, as at 56, and formed with an opening 57 to receive and fit over the stud 50 rising from the closed bottom 46 of the shield 45. The shield 45 constructed as specified is applied over the inlet pipe 14 of the meter and the protector or guard 51 is fitted over the pipe 15, which constitutes the local service pipe for the house or apartment where the meter may be installed. It is obvious that greater protection must be provided for the gas inlet pipe 14 than for the pipe 15, and when the shield 45 is applied over the pipe 14, the upper flange 47 is held within the closure or box-like sections 6 and 8 against the bottoms of said sections, the semicircular openings in the bottoms of the sections 6 and 8 permitting the upper end of the shield 45 to be inserted within these sections. The shield 45 is of such length as to fully cover the pipe 14 so that the latter pipe is protected against irregular tampering therewith to modify the flow of gas into the meter. The recesses 49 conform to the shape of the part of the meter to which they are applied, or permit a close application over a rib or corrugation that is provided in some forms of meters at the upper portion thereof, and the lateral flanges 48 cover a vulnerable part of the meter at the side to which the shield 45 is applied and obstruct penetration into the interior of the meter. The opening or slot 52ª between the arms 52 of the protector or guard 51 will be of such dimensions as to embrace or fit over the pipe 15 and permit the said arms to be brought into close contact or engagement with portions of the side of the meter over which the pipe 15 extends. The upper slotted ends of the arms 52 are inserted through the openings in the bottoms of the closures or box-like sections 7 and 9 to secure the protector or guard in applied position. Prior to the securement of the locking means, or of the members 5, 10 and 11, the coupling bar 55 is connected to the stud 50, and the shield 45 and protector or guard 51 are of such length that when they are applied to the meter as above explained, the said coupling bar 55 will closely engage the bottom of the meter and serve as a means for preventing the lower extremities of the shield 45 and the protector or guard 51 from being pried or forced outwardly away from the opposite lower side portions of the meter. After the shield 45, protector or guard 51 and coupling bar 55 have been applied to the meter and the upper flange 47 of the shield and the slotted ends of the arms 52 inserted within the enclosures or box-like sections 6 and 8 and 7 and 9 respectively, the members 5, 10 and 11 are then locked and the improved protecting means in this simplified form is immovably held in engagement with the meter and all parts of the latter are fully guarded against nefarious tampering methods for the purpose of defeating a normal registering operation of the meter.

In applying the improved protecting means including the shield 45, guard 51 and coupling bar 55 to a prepaid meter as shown by Figs. 3 and 4, the protector or guard 51 is slightly modified to adapt the same to the additional registering features and coin slot means 58 and 59 usually embodied in meters of this type. This modified structure is shown by Fig. 8 and comprises a flat arm 60 similar to one of the arms 52 and having an upper outwardly opening slot 61 for the same purpose as each of the slots 54 of the arms 52, and in parallel relation with the arm 60 of this modified structure is a vertical rod 62 having upper angular extremities 63, the protector or guard in this modified form as far as the remaining features are concerned being in all respect similar to that illustrated by Fig. 7 and including a lower web or connecting member 64 and coupling bar 65 projecting at right angles therefrom. In the modified construction shown by Fig. 8 the reduction of one member of the protector or guard as explained is to provide for a close application of the protector or guard to a prepaid meter structure on the side of the meter to which this protector or guard is applied and shield a part of the side of the meter on opposite sides of the house or apartment service pipe 15 and assist in holding the remaining parts of the protective means for the side of the meter in assembled relation and in locked association with the closures or box-like members 6 and 8 and 7 and 9. The same form of shield 45 is used with the guard shown by Fig. 8 as with the protector or guard 51, and the assemblage of these improved features with the said closures or box-like sections 6 and 8 and 7 and 9 is precisely similar to the assemblage of the shield 45 and protector or guard 51 with the closures or box-like sections.

In some instances it is desirable to add a further protecting means to the present improved features and in combination with the locking means particularly devised for shielding the coupling joints, unions or nuts of the pipes 14 and 15. This additional protecting means is shown by Figs. 11 and 12 and consists of a top casing or cap 66 formed of metal of suitable thickness and preferably of front and rear sections 67 and 68, as shown by Fig. 13. The casing or cap 66 is shown in Fig. 11 as applied to an ordinary monthly meter and in Fig. 12 to a prepaid meter, the casing or cap 66 as shown by Fig. 11 having a single front opening 69 to expose the registering mechanism 70 of the meter;

whereas the casing or cap 66 shown by Fig. 12 has in addition to the opening 69 a smaller opening 71 in the front member thereof to expose the supplemental indicating mechanism 72 usually embodied in the prepaid form of meter. Each of the members 67 and 68 of the casing or cap 66 has the rear portion of its side formed with a slot 73, the complete slot provided by the slot 73 when the members 67 and 68 are operatively assembled and applied giving space for the parts of the sides of the meter and particularly the shield 45 at one side and the protector or guard 51 and its modified structure shown by Fig. 8 at the opposite side. The top rear edge portion of the front member or section 67 of the casing or cap 66 has an angularly bent horizontally extending flange 74 formed as a part thereof and provided with an opening or slot 75 therethrough, and the opposite forward edge portion of the rear member or section 68 has a locking flange 76 projecting upwardly therefrom to pass through the opening or slot 75 and also through a corresponding opening or slot 77 in the bottom portions of the tubular shell or enclosure 5 and the members 10 and 11, as shown in dotted lines by Figs. 11 and 12 and in section by Fig. 13. By this means the members or sections 67 and 68 of the casing or cap 66 are locked in applied position by and with the locking mechanism enclosed within the tubular shell or enclosure 5 and the members 10 and 11. When the casing or cap 66 in either of its applications as shown by Figs. 11 and 12 is locked in the manner just specified, the whole upper part and opposite side portions of the meter are protected at all points that are vulnerable, and irregular manipulation of either a monthly or prepaid form of meter is prevented. Instead of using the form of shield 45 as shown by Fig. 6 and the protectors or guards illustrated in two forms by Figs. 7 and 8, it will be unnecessary in some applications to extend the shield down as far as in the form shown by Fig. 6, in view of the fact that the casing or cap 66 will serve to hold the shield in place. Therefore, the modified form of shield 78 as shown by Figs. 11 and 12 is much shorter or depends less distance over the pipe 14, and the protectors or guards shown by Figs. 7 and 8 are entirely omitted for the reason that the cap members or sections 67 and 68 have their inner opposing end edges engaged over the lateral flanges 79 of the shield 78, these latter flanges being similar to the flanges 48 shown by Fig. 6. It will therefore be understood that the casing or cap 66, forming one of the features of the present invention, is intended to be used in connection with any form of protecting means at the opposite sides of a monthly or prepaid meter structure, or said cap may be particularly associated with the remaining protective features as shown by Figs. 11 and 12 and wherein the guards illustrated by Figs. 7 and 8 are entirely omitted and the shield, as at 78, is shorter than the like positioned form 70 of shield shown by the preceding figures of the drawings.

When all of the protective features hereinbefore described are applied to the meter with or without the casing or cap 66, it will be practically impossible for unauthorized persons to penetrate the parts of the meter that would give interior access to the working and registering organizations of the meter, and as a consequence, the gas is permitted to regularly flow through the meter and a proper registration of the amount of gas used obtained. As compared to the protection of a gas meter, the cost of the several devices adopted to cover the vulnerable parts of the meter and embodying the features of the invention will be small.

It will also be seen that the improved protective devices may be easily applied and secured in place without in the least modifying the standardized construction of meters as now commonly used, and it is proposed to modify the shape and change the proportions and dimensions of the several parts of the protective members or devices to adapt them to application to different forms of meters whenever such changes or modifications may be found necessary.

What is claimed as new is:

1. In a gas meter protecting means, the combination with a meter body and the coupling joints of the supply and service pipes communicating with the meter, of means for completely enclosing the said joints having members extending from one to the other with locking devices concealed within the members and protected against exterior manipulation, and enclosing means for protecting the opposite end portions of the meter body extending upwardly over the said end portions.

2. A gas meter protecting means having terminal devices for fully enclosing the joints of the supply and service pipes of the meter and provided with connecting members which are normally separable, locking means concealed within the members and sealing the latter, and means engaging the opposite ends of the body of the meter and including a shield applied over the supply pipe for the meter associated with and locked applied to the meter by the locking of said members.

3. A gas meter protective means comprising end enclosures for completely covering the joints of the supply and service pipes and provided with locking means normally concealed therein and rendered inaccessible from the exterior of the members, and a separate shield means applied to the supply pipe of the meter and also having a portion thereof engaging a part of the members for securing said shield in place and locked applied to the meter by the locking of said members.

4. A gas meter protecting means comprising enclosures for completely covering the joints of the supply and service pipes of the meter and including movably connected sections having interiorly located locking means to hold the sections closed and the locking means inaccessible from the exterior of said sections when the latter sections are closed, and enclosing means depending from portions of the said sections over the supply pipe and held against displacement by the sections, said enclosing means being primarily separate from the sections and locked in applied position by the closure and locking of the said sections, the sections when closed and locked holding the enclosing means in inseparable engagement therewith.

5. A gas meter protecting means comprising enclosures for completely covering the joints of the supply and service pipes of the meter and including movably connected sections having interiorly located locking means to hold the sections closed and the locking means inaccessible from the exterior of said sections, and means depending from portions of the said sections over the supply pipe and held against displacement by the sections, the said depending means having lateral flanges extending over and guarding parts of the one end of the meter adjacent to the supply pipe.

6. A gas meter protecting means comprising end closures completely covering the joints of the supply and service pipes connected to the meter and including associated sections arranged to extend across the top of the meter and within which is a locking organization to hold the sections against movement and disengagement from the pipe joints when the parts of the sections are closed and locked, and means depending from the end closures over parts of the opposite ends of the meter, the one depending means being tubular in contour and applied over and enclosing the meter supply pipe, the said depending tubular means being primarily separate from but applied to and locked intact with the said sections.

7. A gas meter protecting means comprising terminal enclosing sections for covering the joints of the supply and service pipes attached to the meter and having locking means contained therein for holding the sections inseparable by unauthorized persons, depending means held by the terminal enclosing sections and extending downwardly over portions of the opposite ends of the meter body, one of the said depending means being applied over the supply pipe and having laterally projecting flanges to guard parts of the end of the meter adjacent to said supply pipe.

8. A gas meter protecting means comprising end enclosures for completely covering the joints of the supply and service pipes of the meter and including movably connected sections provided with locking means located interiorly of the sections, and protecting means primarily separate from the enclosures and depending from the said enclosures to cover portions of the opposite ends of the body of the meter and the said pipes, the enclosures for covering the pipe joints and pipes also having means associated therewith for protecting the top of the meter.

9. A gas meter protecting means comprising end enclosures for completely covering the joints of the supply and service pipes of a meter and including movably connected sections and locking means enclosed within the sections, and an enclosing cap to fit over the upper portion of the meter body and also retained in applied position by the said sections and locking means therefor.

10. A gas meter protecting means comprising end enclosures for completely covering the joints of the supply and service pipes of a meter and including a fixed connecting section and hinged sections provided with enclosed locking means, and a covering cap to fit over the upper portion of the body of the meter and provided with means engaging the said sections for holding the same in applied position.

11. A gas meter protecting means comprising end enclosures for completely covering the joints of the supply and service pipes of a meter and including a fixed connecting section and hinged sections provided with enclosed locking means, a covering cap to fit over the upper portion of the body of the meter and provided with means engaging the said sections for holding the same in applied position, and depending protecting means also associated with the end enclosures and engaged by the said cap.

In testimony whereof I have hereunto set my hand.

GEORGE H. SAUTON.